US010103763B2

(12) United States Patent
Butner (10) Patent No.: US 10,103,763 B2
(45) Date of Patent: Oct. 16, 2018

(54) REMEDIAL SIGNAL GENERATOR (71) Applicant: TRUST TECHNOLOGY WORLD DMCC, Dubai (AE)

(72) Inventor: Wayne Butner, Vancouver (CA)

( * ) Notice: Subject to any disclaimer, the term of this patent is extended or adjusted under 35 U.S.C. 154(b) by 0 days.

(21) Appl. No.: 15/119,443

(22) PCT Filed: Feb. 19, 2015

(86) PCT No.: PCT/EP2015/053528
§ 371 (c)(1),
(2) Date: Aug. 17, 2016

(87) PCT Pub. No.: WO2015/124689
PCT Pub. Date: Aug. 27, 2015

(65) Prior Publication Data
US 2017/0126266 A1    May 4, 2017

(30) Foreign Application Priority Data

Dec. 24, 2014   (GB) .................................. 1423184.9
Feb. 19, 2015   (GB) .................................. 1403056.3

(51) Int. Cl.
*H04M 1/00*      (2006.01)
*H04B 1/3827*    (2015.01)
*H04B 17/30*     (2015.01)
*H04B 1/10*      (2006.01)
(52) U.S. Cl.
CPC ........... *H04B 1/3838* (2013.01); *H04B 17/30* (2015.01)
(58) Field of Classification Search
CPC ..... A61N 1/16; H04B 1/3838; H04M 1/0202; H04M 1/21; H04W 24/08

USPC ....................................................... 455/575.5
See application file for complete search history.

(56) References Cited

U.S. PATENT DOCUMENTS 5,544,665 A    8/1996   Litovitz et al.
5,566,685 A    10/1996  Litovitz et al.
(Continued)

FOREIGN PATENT DOCUMENTS

CN         1768446 A    5/2006
CN         101465659 A  6/2009
(Continued)

OTHER PUBLICATIONS

PCT Search Report dated Apr. 29, 2015 for Application No. PCT/EP2015/053528.
(Continued)

*Primary Examiner* — Lee Nguyen
(74) *Attorney, Agent, or Firm* — The Dobrusin Law Firm, PC (57) ABSTRACT A remedial device for the reduction or elimination of the potentially harmful effects on humans or animal life caused by exposure to electromagnetic fields produced by devices that are battery operated and transmit RF signals containing a module for the detection and analysis of the RF signals wherein said module is powered by the battery of the device and when the presence of potentially harmful radiation is detected the detection activates a remedial signal generator and the protocol and mode of communication and the signals are analyzed to determine whether they are likely to cause biological effects and the remedial signal is tailored accordingly.

24 Claims, 2 Drawing Sheets (56) References Cited

U.S. PATENT DOCUMENTS

| | | |
|---|---|---|
| 2002/0011828 A1 | 1/2002 | Walch |
| 2002/0016155 A1 | 2/2002 | Charbonnier |
| 2010/0056210 A1 | 3/2010 | Bychkov |
| 2010/0125438 A1 | 5/2010 | Audet |
| 2010/0203862 A1 | 8/2010 | Friedlander et al. |
| 2013/0203363 A1 | 8/2013 | Gratt et al. |
| 2013/0303092 A1 | 11/2013 | Penafiel |

FOREIGN PATENT DOCUMENTS

| | | | |
|---|---|---|---|
| CN | 201414156 | 2/2010 | |
| GB | 2482421 | 2/2012 | |
| GB | 2484167 | 4/2012 | |
| GB | 2484168 | 4/2012 | |
| WO | 02/00468 | 1/2002 | |
| WO | 2004/089053 A1 | 10/2004 | |
| WO | WO 2012041514 A1 * | 4/2012 | ............... A61N 1/16 |

OTHER PUBLICATIONS

International Preliminary Report on Patentability dated May 13, 2016 for Application No. PCT/EP2015/053528.

UK Intellectual Property Office Search Report dated Jul. 25, 2014 for Application No. GB1403056.3.

UK Intellectual Property Office Search Report and Office Action dated Jun. 22, 2015 for Application No. GB1423184.9.

First Office Action from the State Intellectual Property Office of the People's Republic of China for Application No. 201580016959.7, dated May 4, 2018.

* cited by examiner

REMEDIAL SIGNAL GENERATOR

FIELD

The present invention relates to methods and apparatus for protecting living systems from potentially adverse effects upon them from electric fields, magnetic fields and electromagnetic fields. The invention is particularly concerned with protection from potentially adverse radiation from modern day battery powered mobile telecommunications handsets which are used for a variety of functions including both voice and data transmission. In particular the invention is concerned with protection when the handset is used in close proximity to the body, in particular the head, as is often the case during voice transmission.

BACKGROUND

All electromagnetic radiation consists of oscillating electric and magnetic fields and the frequency, which is the number of times per second at which the wave oscillates, determines their properties and the use that can be made of them. Frequencies are measured in hertz or Hz, where 1 Hz is one oscillation per second, 1 kHz a thousand, 1 MHz is a million, and GHz, is a thousand million. Frequencies between 30 KHz and 300 GHz are widely used for telecommunications, including broadcast radio and television, and comprise the radio frequency band.

Cellular mobile services operate at frequencies authorised by governments and typically operate within the frequency ranges 872-960 MHz, 1710-1875 MHz and 1920-2170 MHz. These frequencies are within the microwave frequency band which encompasses the range between 300 MHz and 300 GHz. Wi-Fi Communications operate at frequencies authorised by governments and typically operate between frequency bands 2.4 GHz and 5 GHz ISM. Other applications within this range include radar, telecommunication links, satellite communications, weather observation and medical diathermy. This invention is particularly useful with devices that operate on frequencies used for cellular telephones.

A radio frequency wave used to carry information in radio communications is referred to as a carrier wave. The radio frequency carrier wave of any system is produced by the transmitter as a sine wave, or other regular waveform. A carrier wave conveys no information if its properties do not vary in time. If the carrier wave is to convey any information, for instance, speech, music or digitized data, this information has to be added to it in some way. The process of varying one or more properties of a carrier signal with respect to the information that it is to carry is known as modulation. Properties of the carrier wave that may be varied through modulation include for instance, amplitude, frequency, phase or any combination of these. For example, for AM (amplitude modulation) transmission, the electrical signal from a microphone produced by speech or music is used to vary the amplitude of the carrier wave, so that at any instant the size or amplitude of the RF carrier wave is made proportional to the size of the electrical modulating signal. In FM (frequency modulation), the instantaneous frequency of the carrier deviates from the carrier frequency by an amount dependent on the strength of the modulating signal. Phase modulation (PM) is a form of modulation that represents information as variations in the instantaneous phase of a carrier wave. FM and PM are very commonly used for current day radio communications.

A mobile phone (cell phone) sends and receives information (voice messages, text messages, emails, fax, computer data, downloads information etc) by radio communication. Radio frequency signals are transmitted from the phone to the nearest base station and incoming signals (carrying the information from the source to which the phone user is listening) are sent from the base station to the phone at a slightly different frequency. Base stations link mobile phones to the rest of the mobile and fixed phone network. Once the signal reaches a base station it can be transmitted to the main telephone network, usually by an optical fiber network.

Each base station provides radio coverage to a geographical area known as a cell. Base stations (BS) are connected to one another by a mobile services switching centre (MSC), which tracks calls and transfers them as the caller moves from one cell to the next. An ideal network may be envisaged as consisting of a mesh of hexagonal cells, each with a base station at its centre. The cells overlap at the edges to ensure the mobile phone users always remain within range of the base station. Without sufficient base stations in the right locations, mobile phones will not work. If a person with a mobile phone starts to move out of one cell into another, the controlling network hands over communications to the adjacent base station.

There are conflicting views as to the effects of electric fields, magnetic fields and electromagnetic fields on living systems. However there is considerable evidence showing that certain fields are able to trigger a range of biological effects in various biological systems and that these effects may be damaging to living systems including humans. There are now also a growing number of studies linking mobile phone use to serious health issues such as brain tumours and infertility. It may also be that the detrimental effects are long term and their full impact has not yet been realised. WO 02/00468 recognises that the reaction may be harmful and provides a system that detects radiation and issues a warning if a level of radiation is exceeded. It does not however determine if the radiation is potentially harmful and does not take any remedial action to rectify the situation.

There has been a dramatic increase around the world in the use of electrically operated devices particularly battery powered hand held mobile telephones. All such devices have associated with them electromagnetic field emissions which, to varying degrees, have the potential to affect human health. Of particular interest are devices that transmit radio frequency (RF) signals and are used in close proximity to the human body particularly the head, for instance hand held cellular phones and other personal communication devices. At issue is the possibility that the safety standards under which these devices are manufactured, which establish RF exposure limits to the users of these devices, may not adequately account for effects below the thermal threshold, that is, at exposure levels well below levels that can produce measureable heating and can be attributed to direct energy transfer. The potential for such low level effects is supported by substantial evidence from epidemiologic studies and laboratory research which suggests that any measures that could reduce and/or minimize the effects of such exposure would be beneficial to the users of these devices. Laboratory research also suggests that the severity of impact from RF exposure at non-thermal levels is dependent on the modulation characteristics of the RF signal, in particular amplitude variations in the low frequency envelope. Signals that display a greater degree of regularity have been shown to have greater biological impact.

Modern mobile devices include a wide range of services which employ complex communication schemes. In the operation of such devices, the modulation characteristics of transmitted RF signals can vary substantially depending on the type of information that is being transmitted, for instance, voice or data. Accordingly, the extent of biological effects can also vary. It is therefore desirable that a remedial system be capable of assessing the nature of the modulation to determine the potential extent of biological impact. Furthermore, such a remedial system should be compact and adaptable for use with different telephone handsets and different battery systems. Additionally it is desirable that the remedial system operates effectively, is only used when required as determined by the emitted radiation and hence consumes little power from the battery to preserve battery life.

U.S. Pat. No. 5,544,665 is concerned with the protection of living systems from the harmful effects of electromagnetic fields and states that certain fields have an effect on the enzyme ornithine decarboxylase. The patent states that the potentially damaging effect can be reduced or eliminated if the detrimental electromagnetic field is altered either by switching the field on and off or superimposing an electromagnetic noise field upon it. The patent further states that the effect can only be reduced if such alteration causes relevant characteristic properties of the field to change in time at intervals of less than 5 seconds and preferably at intervals from 0.1 to 1 second. The characteristic properties that can be changed are said to be frequency, phase, direction, waveform or amplitude. Similar effects are discussed in Bioelectromagnetics 14 395-403 (1993) and Bioelectromagnetics 18 388-395 (1997).

U.S. Pat. No. 5,544,665 dates from 1991 and describes various applications of the bio-protection scheme including applications to cellular telephones of the type available at that time which were bulky and used only for voice transmission. The EMX Corporation has promoted batteries for such cellular telephones that make use of the technology described in U.S. Pat. No. 5,544,665. When used with a cellular phone, these batteries are said to produce an electromagnetic noise field that is superimposed over the local RF field generated by the operation of the telephone for voice transmission thereby causing the total field to be irregular and thus not likely to cause biological effects. The noise was generated by a coil forming part of the battery pack. Activation of the noise was accomplished by monitoring the flow of electric current from the battery to the phone and using this as an indirect means to determine when the phone was transmitting RF fields that were likely to produce biological effects. This activation technique worked reasonably well with older phones but proved to be unreliable with newer phones that now have many more applications that demand power from the battery but do not produce RF fields. Use of such applications could cause false triggering of the noise and potentially unnecessary and unacceptable reduction in battery life.

GB Patent Application 2482421 A provides a system that determines when RF emissions are being emitted from a personal communication device such as a mobile telephone. According to GB 2482421 when an emission is detected the system outputs a low frequency modulated RF confusion field from an RF transmitter located within the personal communication device, as opposed to a low frequency magnetic field. The determination is made based on information provided by the RF transmission module and not by either the detection of the presence of the signal, or analysis of the signal to determine whether the signal is likely to cause biological effects. This may be costly and to generate the confusion signal is power consuming.

In WO 2012/041514 we describe technology that addresses these issues and provides a process, an apparatus and systems for the reduction or elimination of the potentially harmful effect on humans or animal life caused by exposure to electromagnetic fields produced by devices that operate by transmitting RF signals. The technology comprises a device provided with means to reduce or eliminate the potentially harmful effect of the RF signals and further provided with a means to sense and analyse RF fields and assess their ability to produce biological effects, and which activates the means to reduce or eliminate the potentially harmful effect of the measured RF signals on humans or animal life based on the outcome of that assessment.

The techniques described in WO 2012/041514 prefer to employ the combination of a passive radio frequency detector to monitor the local RF field which wakes up an active radio frequency detector when a potentially harmful bio-effective field is detected. The passive detector would activate (Power on) the remedial device to initiate analysis of a radio frequency signal received by the antenna by means of a remedial control module. This system does not however provide adequate power management for both the required term operation of the device and the detection and analysis of the potentially harmful signal and the generation of the remedial signal.

We have found that particularly when used with modern day battery powered portable telephone handsets with so many functions the constant powering of such an active circuit by the battery can create an undesirable drain on the battery. Accordingly the present invention provides a design which minimizes power consumption while allowing monitoring of the RF field and providing any remediation that may be required.

SUMMARY

Accordingly the invention provides a remedial device for the reduction or elimination of the potentially harmful effect on humans or animal life caused by exposure to electromagnetic fields produced by devices that are battery operated to transmit RF signals containing a module for the detection and analysis of the RF signals wherein said module is preferably powered by the battery of the device and when the presence of potentially harmful radiation is detected the detection module activates a remedial signal generator.

The design minimizes power consumption while still allowing monitoring of the RF field when needed. In the preferred embodiment means are provided to monitor the power drain on the battery and the application conditions are monitored and the maximum power drain is set accordingly. Power drain can be set to be at its lowest when the battery is in storage, somewhat higher when the battery is connected to the phone and battery voltage is above a certain acceptable level, and highest but still as low as possible when RF is being generated and needs to be assessed. In all cases battery voltage is measured and in the last two environments both battery voltage and the RF signal are measured. The power management control may conveniently be implemented by software which is executed within a microcontroller forming part of the remedial device.

DETAILED DESCRIPTION

According to the present invention, the detection module is configured to measure the low frequency envelope of an RF signal and follow its variation in amplitude over a prescribed interval, preferably of the order of 1 second. Those measurements are then analysed to assess the need to turn on the remedial signal. The amplitude variation of the low frequency envelope differs depending on the transmission protocol and the information being transmitted. In general, amplitude variation patterns for voice transmission are different than for data transmission and are characteristic of signals that are more likely to cause biological effects. Furthermore, voice transmission often implies proximity of the handset to the head which also increases the likelihood of biological effects. Therefore, identification of the communication mode can be useful in the determination of potential biological impact. Accordingly, in the present invention the detected signals can be analysed to identify the communication modes and determine the nature and level of the remedial signal required. By way of example the analysis can determine the communication protocol and can differentiate between GSM voice communication mode, 3G or 4G voice communication mode and 3G or 4G data communication mode. The differentiation is preferably performed by an analytical module within a microcontroller that is programmed to detect the different communication modes. The analysis can also determine the strength and duration of the RF signal.

The remedial signal can then be switched on according to the radiation sensed and the strength of the remedial signal can be tailored to the nature of the radiation that has been sensed. For example, if the remedial signal strength in relation to GSM voice communication is deemed to be 100%, for voice communication for 3G, 50% may be sufficient whereas for 3G data communication 25% may be required. The micro controller can be programmed to cause the remedial signal generator to provide signals of the appropriate strength according to the analysis of the signals received.

The detector is preferably an antenna. The Antenna monitors the radio frequency field in the environment of the telecommunication device. In the preferred embodiment the signal is amplified and transmitted to a micro-controller, which receives the signal identified by the antenna and checks if the signal is bio-effective or not. If the signal is considered to be bio-effective the micro-controller activates the protective signal by causing current to flow through a coil so generating the protective signal.

The radio frequency signal amplitude can be difficult to measure and it can be difficult to determine if it is bio-effective. Furthermore, it is often necessary to monitor the field over a wide range of frequencies in order to cover all the operating frequencies of the cellular telephone (ranging from approximately 800 MHz to 3 GHz). We prefer therefore to rectify the detected signal by for example a radio frequency diode and to split the signal into at least two levels (high and low amplitude). Subsequently, the microcontroller may be programmed to allow us to monitor the communication protocol (GSM, 3G, 4G, etc), which can manifest the low frequency envelope. In U.S. Pat. No. 6,263,878B Litovitz describes how the low frequency modulations have been shown to cause adverse effects on the body.

In our preferred design the micro-controller operates the entire system and it also operates a timer to check periodically if the potentially harmful signal is present. The micro-controller may also be programmed to recognise the type of radio frequency signal that is being detected and to monitor the battery power and the remaining battery life.

The invention therefore uses detection of the stimulating signal to trigger the remedial activity and employs a micro-controller programmed to recognise key characteristics of the stimulating signal to determine whether biological effects are likely to occur and hence whether the protective signal is required.

The invention therefore allows the strength of the remedial signal to be tailored according to the nature and strength of the potentially harmful radiation which in turn depends upon the detected mode of operation of the telecommunication handset.

In a preferred embodiment power management is provided using a timer that switches the power supply to a component of the detection module and to the remedial signal module on and off to minimise the power drain from the battery and yet provide active (powered) detection of the potentially harmful signals. The timer should be one that requires a minimal power for operation and is directly connected to the battery. The timer preferably has a wake up interval to preserve battery life and the wake up interval should be sufficiently small to allow analysis of any Radio Frequency signals detected by the antenna so as to determine if there are any harmful signals in time to activate the remedial signal generator.

The present invention minimizes power consumption while still allowing monitoring of the RF field when needed. In the preferred embodiment means are provided to monitor the power drain and the application conditions are monitored and as discussed the power drain is set accordingly. As discussed the power management control may conveniently be implemented by software which is executed within a microcontroller and many functions can be implemented within such a microcontroller. In particular it can monitor parameters such as:

Battery voltage: sourced from circuit that connects to the battery

RF signal. The microcontroller can control Output parameters such as the Power control signals, the Bioprotection noise signal. Additional functions which can be implemented in the software include:

Application state classification and power management, implementation of application state monitoring and control algorithms, implementation of RF signal classification algorithms, implementation of the remedial bioprotection signal generator.

The invention may be applied to most electronic devices that operate by transmitting RF signals which could be potentially harmful to human or animal life, but it is particularly useful with battery powered personal communication devices, such as cellular telephones, that are used in close proximity to the human body particularly to the head. In a preferred embodiment the invention provides a system that can be readily adapted for use with a variety of mobile phone designs and their associated batteries and accessories.

Earlier studies have shown that RF radiation can cause potentially harmful effects if it is regular, meaning that it has constant properties, and is continuously applied for periods of over 10 seconds and that the potential harm can be substantially eliminated if the regularity period is reduced to no more than 1 second. The means to eliminate the potential harm in the present invention may superimpose an electromagnetic noise field on the potentially harmful radiation to produce a combined field that is irregular in time, meaning that it does not have constant properties in time, and therefore no longer has the potential to cause harm. Use of the noise field, which is hereinafter referred to as the remedial signal, is preferred as it allows for use of the electronic device without altering the manner in which it operates.

The invention is particularly useful with battery operated personal communication devices. In the preferred embodiment the potentially harmful effect of the RF radiation is inhibited by a means that generates an appropriate remedial signal that is superimposed on the RF signal to provide a combined signal that is irregular and therefore has no bio-effecting consequence. Any suitable means may be used but the means may comprise an inductive coil which is activated to produce the remedial signal field, primarily magnetic in nature, employing power from the battery of the cellular telephone.

The means which senses and identifies the potentially harmful radiation may be any standard RF sensor. As described we prefer to use an antenna, with accompanying electronics, which have been suitably configured to identify the particular radiation which is emitted by the electronic device and determine if it is considered to be potentially harmful. The antenna is preferably a wire such as a copper wire which can be fitted into any convenient space within an existing telephone handset without requiring any significant modification thereof. Additionally the means may be provided with means to differentiate the nature of the radiation according to the communication mode that is being employed (voice, text, data etc). In order to enhance the selectivity of the device it is preferred to amplify the signal received prior to analysis and accordingly the sensing means preferably includes an amplifier in addition to the preferred antenna.

The system of the invention may be formed to fit within existing cellular phone handsets or other personal communication devices, with little or no modification to the devices. For instance, the component may be such that it may be incorporated inside the handset and maybe in association with a phone case or battery pack that provides power to the handset. The preferred system comprises an electronic circuit that comprises an RF antenna, a signal detection module, an analysis module and a remedial signal activation module and a coil for generating the remedial signal field. The signal detection module, the analysis module and the signal activation module may be implemented using a microcontroller. The coil may be formed around the battery of the handset. Where the battery is lithium polymer, the coil may be physically pressed into the battery, so as to minimize the space needed to accommodate this part. Alternatively the system may be separate from the battery within the handset, or separate from the handset but adapted to be placed next to the handset while the handset is in use to provide a remedial signal. For example the component may be formed as a card article, such as a card of credit card dimensions and shape, with electronics incorporated within the card, and a coil for providing the remedial signal being formed around the edge of the card.

As described the system is preferably managed by a microcontroller which performs the analysis function of the received signal and the control function of the remedial signal. In a preferred embodiment the microcontroller also oversees the operation of the system and can sense the remaining capacity of the battery and transition the system to storage mode minimizing current consumption prior to recharging.

The invention therefore provides more specifically, a remedial device for association with a battery powered personal communication device that emits RF transmissions potentially harmful to humans or animal life, the remedial device including sensor means operated by the battery for sensing the presence of said RF transmissions, signal analysis means for assessing the RF transmissions to determine if they are likely to cause biological effects, and a remedial signal generator means also operated by the battery, said signal analysis means being coupled for actuation of said remedial signal generator means, and the remedial signal generation means being arranged to establish a remedial electromagnetic field in the vicinity of the handset. In a preferred embodiment power management is implemented to conserve battery power. In the preferred embodiment the signal analysis means differentiates between signals generated by voice communication and those generated by other forms of communication such as data communication so as to activate the appropriate remedial signal. In particular the signal analysis can differentiate between signals with different low frequency envelope patterns for example the amplitude and timing, to identify if voice or data is being transmitted which in turn provides an indication of the potential for the radiation to cause harm. Additionally the analysis means can determine the strength and/or duration of the potentially harmful radiation.

The RF sensor, is preferably an antenna, which has been suitably configured to detect the particular radiation which is emitted by the electronic device and which is considered to be potentially harmful. The antenna may be positioned anywhere within the telephone handset and should be responsive to a carrier wave frequency of the cellular handset that is a microwave frequency in the region of 0.8 to 2 GHz, as detailed below. (As an alternative to a separate antenna, the coil for establishing the remedial field may also be configured to detect RF transmissions.)

The RF detection stage, for detecting RF transmissions that may contain potentially harmful components, preferably includes a signal analysis means, which signal analysis means is arranged to make an analysis of the detected RF transmissions in order to make a determination of whether the characteristics of the transmission signal has features that would indicate that it is potentially harmful and activate the remedial signal accordingly. The RF detection stage may be arranged to provide an actuation signal to the signal analysis means. The detection stage is activated by the battery of the handset perhaps through use of a timer and is arranged to monitor RF emissions from the handset, and to rectify and integrate an RF transmission signal. One or more delayed versions of the detected signal are compared with the current version. The amplitude and timing of the detected signal are evaluated in order to determine whether there is RF radiation of significant duration that is likely to cause biological effects. This is typically the case during speech transmission to and from the handset. In this event, a power control signal is generated. Although the detected signal may be of low strength it may still be potentially damaging to health and we prefer to provide an amplifier between the active detector and the analysis module to enable detailed analysis and good use of the signal.

The use of passive (unamplified) and active (amplified) detection modules therefore allows for evaluation of the antenna signal over a wide signal range. The output of the passive and active detector modules may then be evaluated using software loaded in the microcontroller which also controls the remedial signal generator. The signal analysis means (software loaded in the microcontroller) examines the amplitude and timing characteristics of the detected signals to determine whether the transmission is voice or data and the likely transmission protocol, for instance, GSM, 3G or other commonly used protocols, and whether the particular type of transmission contains features that would indicate that it is potentially harmful.

The signal analysis means may provide an activation signal to a power control module within the microcontroller to enable supply of power to said remedial signal generator (or selected parts thereof). The remedial control generator may include a remedial signal control module, which provides a control signal to the power source, and a control signal to a remedial signal generator module, for generating the desired form of remedial signal. The remedial signal control module is responsive to an output from the RF detection stage, and is preferably provided within a microcontroller for executing one or more algorithms for controlling the remedial signal generator module. The microcontroller can also implement the power management and the signal analysis activity. As preferred, the control module waits for a period of about 1 second until it receives a continual output from the detection stages, and then requests the power unit to provide power to the generator module, so that the remedial signal is generated for a period of about 3 seconds. The waiting period of about 1 second is significant in that it represents a minimum period in which the presence of an RF signal may trigger a response in living tissue. Any radiation generated by the handset for a period of less than this minimum period is regarded as not requiring remedial action. The period of 3 seconds is chosen on the grounds of convenience, since with a longer period, a remedial field may be generated when it is not required, and a shorter period may result in excessive switching operations within the circuitry. At the end of the 3 second period, the control module is reset unless or until a continual signal is again present from the RF detection stages.

The remedial signal generator module may include a digital noise generator, which is coupled through digital to analog conversion means and filter means, for providing an analog form of the remedial signal, to a coil which provides a means for establishing the remedial field in the neighbourhood of the handset.

The radiation with which this invention is particularly concerned is that emitted by the cellular telephone when it is transmitting or receiving information especially voice information and particularly when it is transmitting voice information as this tends to generate more RF signals and in particular when it is transmitting or receiving speech as that is generally the time when the telephone is in closest proximity to the head, and transmission radiation occurs for a significant length of time so increasing the likelihood of the creation of harmful biological effects.

In operation therefore the cellular telephone will be activated for use and will immediately generate the potentially harmful radiation at the particular predetermined frequency. The presence of the radiation will immediately be sensed and analysed by the sensor and detection means of the invention, which if required will then activate the remedial signal (noise) generator means that converts the constant potentially harmful radiation to a random benign wave pattern. The sensor and detection means can also detect when the potentially harmful radiation is no longer being generated and deactivate the remedial signal until the next time that it is required. As disclosed in prior art negation of the potentially harmful effect of the radiation generated by use of a cellular telephone can be achieved with a remedial signal having a frequency preferably in the range 30 Hz to 90 Hz.

An important aspect of an embodiment is that the radiation sensor and detector and the generator of the remedial signal can be incorporated into the cellular telephone without the need to alter the structure of the cellular telephone itself. In order to be useful in mobile telephones the remedial device should preferably fit within conventional handsets without requiring modification of the handsets. It is therefore important that the remedial device be miniaturized. Additionally it is important that the device is flexible and readily adaptable so that it can be used in a wide variety of handsets. The remedial device therefore contains a microcontroller which incorporates and directs many of the functions of the remedial device such as the RF signal analyser module and, the remedial signal generator module. Use of such a microcontroller together with a small antenna and a miniaturised remedial signal amplifier provides a miniaturised system useful with a wide range of handsets and with a wide range of batteries. As previously described the antenna may also be compact to fit within existing mobile telephone handsets. A copper wire is particularly useful.

The invention may be used with any of the battery cells used for cellular telephones such as lithium ion batteries but use with the softer batteries such as lithium polymer batteries may be advantageous since the printed circuit board containing the components of this invention and the coil can be pressed into the battery casing to provide a battery with minimal reduction in battery capacity relative to a standard equivalent battery.

Figure 1:
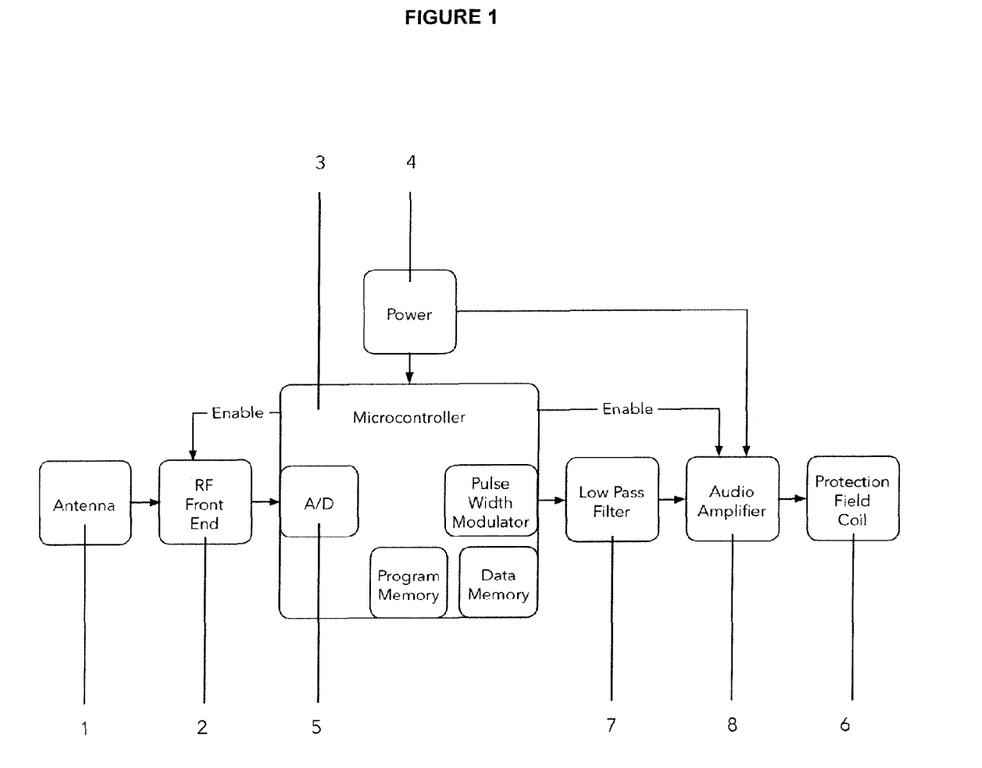
FIG. 1 is a a schematic illustration of the architecture of a remedial signal generator according to the present invention.

FIG. 1 hereto is a schematic illustration of the architecture of a remedial signal generator according to the present invention.

The generator comprises a detector for Radio Frequency Signals such as the Antenna (1) which feeds information concerning the signals it detects into the Radio Frequency Front End detector (2) which is powered on instruction from the microcontroller (3) from a power source (4) which is typically the battery of the mobile telephone handset. The signal which may be amplified in the RF Front End then passes to an analogue/digital convertor (5) which may be within the microcontroller (3). The signal is then analysed to determine the nature of the radiation to assess if it includes potentially harmful radiation, the analysis being performed within the microcontroller (3). Based on the nature of the signal analysed the microcontroller passes a signal to actuate the remedial signal generator which consists of a signal implemented within the microcontroller and followed by a low pass filter (7) the output of which typically feeds an audio amplifier (8) and then a bioprotective field coil (6). All components are powered by the power source (4). In this way the bioprotective remedial field is provided according to the radiation sensed by the antenna with analysis, control and remedial signal generation modules implemented within the microcontroller. The microcontroller may also be provided with means (not shown) for power management including verifying the charge remaining in the power source and for moving the system to a storage mode when the charge is low and waiting for recharging.

Figure 2:
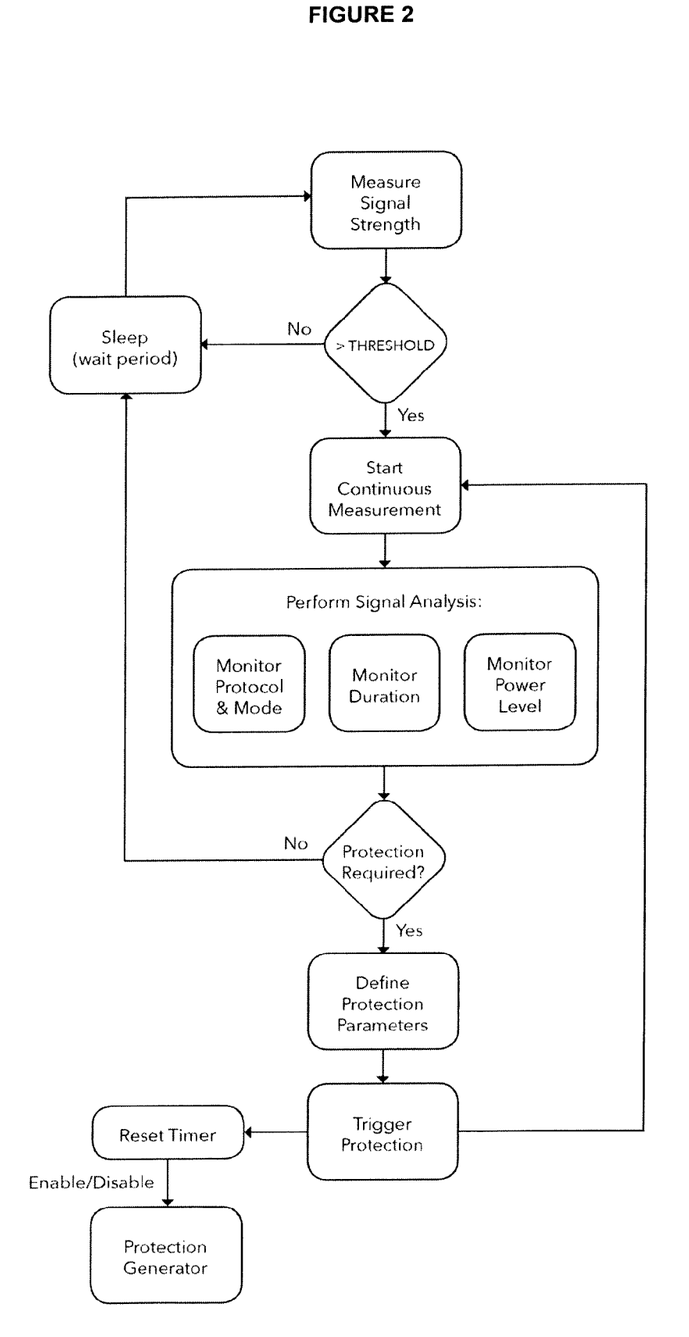
FIG. 2 is an activity flow chart illustrating operation of the invention.

The operation of the invention is illustrated by the activity flow chart that is FIG. 2 hereof.

In the embodiment illustrated in FIG. 2 the remedial device of the invention includes means for detecting the radio frequency (RF) signal emitted by a personal communication device. The detection means determines the power or strength of the signal and determines if it has the potential to be harmful. If the signal is weak and is deemed not to be potentially harmful the detection means is deactivated for a certain period of time after which it is reactivated to verify if the situation has changed.

If however the signal is considered to have a strength that is potentially harmful several continuous measurements of the signal are taken and analysed to determine the protocol (GSM, 3G, 4G etc) and mode (voice or data) of the signal and also the power level of the signal and the duration of the signal. This determination indicates if a remedial signal is required. If the determination is that no remedial signal is required as indicated by any one or any combination of the aspects analysed the device will be deactivated for a certain period of time after which it can be reactivated to verify if the situation has changed.

If however the determination is that a remedial signal is required then the device determines the nature and level of remedial signal required based on the analysis of the signal (protocol, mode, power, duration etc) and then activates the generation of the appropriate remedial signal. In a preferred embodiment the remedial signal generator contains a timer which ensures that the remedial signal is provided for at least a certain period of time. The timer being such that the provision of the remedial signal can only be deactivated after a specified period of time after the overall detection system concludes that a remedial signal is no longer required. This ensures that the remedial signal continues to be provided for a certain period of time beyond the conclusion of the overall detection system so that the remedial signal is effective.

The entire system as described can be contained within a microprocessor and may be activated by the initial determination of the radiation by an antenna. The microprocessor being provided as a component within the communication device or as part of the battery or case system.

We have found that the system as described enables an effective remedial signal to be provided when needed whilst minimizing the drain on the battery of the communication device which is used to provide the remedial signal. In particular the determination of the protocol causing the generation of the potentially damaging signal, the monitoring of the power level and duration of the potentially damaging signal enables the protection level required to be determined. For example voice communication with the communication device close to the head may require a higher protection level than data communication with the device some distance away from the body. This enables the remedial signal to be at the required level which in turn ensures that only the required power is taken from the battery. At the same time the timer ensures that the remedial signal is provided for long enough to be effective.

The invention claimed is:

1. A remedial device for the reduction or elimination of the potentially harmful effect on humans or animal life caused by exposure to electromagnetic fields produced by devices that are operated by a battery and transmit RF signals, comprising: a module for a detection and an analysis of the RF signals,
   wherein the module determines a protocol and mode of operation of the remedial device;
   wherein the module determines a power level of the RF signal;
   wherein, when the presence of potentially harmful radiation is detected, the detection activates a remedial signal generator; and
   wherein the remedial device is contained in a personal communication device.

2. The remedial device according to claim 1, wherein the module determines a duration of the RF signal.

3. The remedial device according to claim 1, wherein the module is powered by the battery.

4. The remedial device according to claim 1, wherein the RF signals are analyzed to differentiate between voice and data transmissions.

5. The remedial device according to claim 4, wherein the remedial device differentiates between voice and data communication modes of communication protocols.

6. The remedial device according to claim 5, wherein the communication protocols include GSM, 3G, 4G and Wi-Fi.

7. The remedial device according claim 5, wherein the differentiation is performed by a microcontroller that is programmed to detect the voice and data communication modes.

8. The remedial device according to claim 1, wherein the remedial signal generator is switched on according to the radiation detected and a strength of the remedial signal generator is tailored to the nature of the radiation that has been detected.

9. The remedial device according to claim 8, wherein the strength of the remedial signal is tailored to a strength of the radiation that has been detected.

10. The remedial device according to claim 1, wherein the module includes an antenna.

11. The remedial device according to claim 10, wherein the RF signals are detected by the antenna and conveyed to a microcontroller.

12. The remedial device according to claim 11, wherein the RF signals are rectified.

13. The remedial device according to claim 1, wherein the RF signals detected are amplified to provide a required range for analysis.

14. The remedial device according to claim 1, wherein a timer is provided to control an interval between detections.

15. The remedial device according to claim 14, wherein the timer is activated for an interval that is small enough to preserve battery life while still allowing analysis of the RF signals detected.

16. The remedial device according to claim 1, further comprising:
   I. an RF antenna;
   II. a microcontroller that operates the module and the remedial signal generator; and
   III. a coil for applying a remedial signal field generated by the remedial signal generator.

17. The remedial device according to claim 16, wherein power management of the remedial device is implemented by software executed by the microcontroller.

18. The remedial device according to claim 1, wherein the personal communication device is battery powered.

19. The personal communication device according to claim 18, wherein the remedial device is incorporated inside a handset of the personal communication device.

20. The remedial device according to claim 1, wherein a battery of the personal communication device contains the remedial device.

21. The remedial device according to claim 1, wherein the personal communication device is a mobile phone.

22. A remedial device for the reduction or elimination of the potentially harmful effect on humans or animal life caused by exposure to electromagnetic fields produced by devices that are operated by a battery and transmit RF signals, comprising: a module for a detection and an analysis of the RF signals, wherein the module determines a protocol and/or mode of operation of the remedial device; and wherein, when the presence of potentially harmful radiation is detected, the detection activates a remedial signal generator; and wherein the module measures a variation in time of an amplitude of a low frequency envelope of the transmitted RF signals.

23. A remedial device for the reduction or elimination of the potentially harmful effect on humans or animal life caused by exposure to electromagnetic fields produced by devices that are battery operated by a battery and transmit RF signals, comprising:

I. a module for a detection and an analysis of the RF signals; and

II. a timer to control an interval between detections, wherein, when the presence of potentially harmful radiation is detected, the detection activates a remedial signal generator;

wherein the module determines a power level of the RF signal; and wherein the timer further controls measurements of the power level of the RF signal to determine an averaged power over a predetermined duration.

24. The remedial device according to claim 23, wherein a strength of the remedial signal is tailored to a strength of the radiation that has been detected.

\* \* \* \* \*

UNITED STATES PATENT AND TRADEMARK OFFICE
CERTIFICATE OF CORRECTION

PATENT NO. : 10,103,763 B2
APPLICATION NO. : 15/119443
DATED : October 16, 2018
INVENTOR(S) : Butner Page 1 of 1

It is certified that error appears in the above-identified patent and that said Letters Patent is hereby corrected as shown below:

On the Title Page

Foreign Application Priority Data:
Delete "February 19, 2015" and replace with --February 21, 2014--

Signed and Sealed this
Twenty-seventh Day of November, 2018

Andrei Iancu
*Director of the United States Patent and Trademark Office*